US006571047B1

(12) United States Patent
Yarkosky et al.

(10) Patent No.: US 6,571,047 B1
(45) Date of Patent: May 27, 2003

(54) INTER-BAY FIBER MANAGEMENT ASSEMBLY

(75) Inventors: Francis R Yarkosky, Kansas City, MO (US); David W. Williams, Olathe, KS (US)

(73) Assignee: Sprint Spectrum, L.P., Overland Park, KS (US)

( * ) Notice: Subject to any disclaimer, the term of this patent is extended or adjusted under 35 U.S.C. 154(b) by 0 days.

(21) Appl. No.: 09/551,125

(22) Filed: Apr. 18, 2000

(51) Int. Cl.[7] .................................................. G02B 6/00
(52) U.S. Cl. ........................................ 385/135; 385/137
(58) Field of Search .................................. 385/134, 135, 385/136, 137, 53

(56) References Cited

U.S. PATENT DOCUMENTS 5,758,002 A * 5/1998 Walters ...................... 385/134

* cited by examiner

Primary Examiner—Cassandra Spyrou
Assistant Examiner—Euncha Cherry
(74) Attorney, Agent, or Firm—Harley R. Ball; Steven J. Funk; Kevin D. Robb (57) ABSTRACT

The illustrated fiber management assembly includes a rectangular case configured to fit between bays of equipment. Fiber connected to the equipment bays enters the case through a top inlet opening and exits the case through one of two outlet openings extending along respective sides of the case, with any excess fiber being located within the storage chamber defined by the case. Adjacent the inlet opening of the case is a clamp that is compressible around the fiber to relieve axial loading on the fiber. The management assembly is provided with a slack take-up mechanism that is configured to support excess fiber in a looped arrangement within the storage chamber. The slack take-up mechanism includes a plurality of spool assemblies adjustably positioned along the length of the storage chamber. Supported for sliding movement along the length of each outlet opening is at least one fiber router designed to support the fiber exiting the storage chamber and limit bending of the fiber as it is directed to the equipment bay.

19 Claims, 8 Drawing Sheets

INTER-BAY FIBER MANAGEMENT ASSEMBLY

BACKGROUND OF THE INVENTION

1. Field of the Invention

The present invention relates generally to equipment and accessories used with fiber and multiple-fiber cable (e.g., optical fiber and cable). More particularly, the present invention concerns a fiber manager that manages the fiber connected to a bay of equipment, wherein the manager is capable of storing slack or excess fiber, relieving longitudinal strain on the fiber, and generally facilitating the organization and direction of the fiber to the various equipment of the bay.

2. Discussion of Prior Art

Fiber management is particularly problematic in situations involving a large number of fibers located in a confined space. Such a problem is being progressively realized in the telecommunications industry where improvements in equipment capacity has multiplied the number of optical fibers that are connected to a single piece of equipment. For example, dense wavelength division multiplexing systems now permit eighty or more channels to be connected to several network elements. Those ordinarily skilled in the art will appreciate that each channel requires two fibers, one "in" fiber and one "out" fiber.

The telecommunications industry has attempted to handle fiber congestion by placing conduit between adjacent bays of equipment. The standard inter-bay conduit is rectangular in shape and has an open front and sidewalls defined by removable teeth, such that the fiber simply hangs within the conduit and is directed laterally to one of the bays of equipment through the space defined by one or more removed teeth. The fiber is consequently unsupported within the conduit. Furthermore, the fiber must be cut to an appropriate length; otherwise, excess fiber dangles below the space in an uncontrolled manner or must alternatively be stored within the bay. It has been determined that excess fiber within the conduit inhibits proper organization and direction of the fiber and often causes excessive bending of the fiber (i.e., bending of the fiber beyond the so-called "minimum bend angle"). Those ordinarily skilled in the art will appreciate that excessive bending can cause attenuation of the signal carried by the fiber and, in extreme cases, fracture of the fiber.

OBJECTS AND SUMMARY OF THE INVENTION

Responsive to these and other problems, an important object of the present invention is to provide a fiber management assembly that effectively manages fiber connected to a bay or bays of equipment. It is also an important object of the present invention to provide a fiber management assembly that is configured to neatly store the slack of fiber connected to the associated equipment bay(s). Another important object of the present invention is to provide a fiber management assembly that relieves longitudinal strain on the fibers. Additionally, an important object of the present invention is to provide an assembly that virtually eliminates the risk of excessive bending of the fiber connected to an equipment bay. Yet another important object of the present invention is to provide a fiber management assembly that greatly facilitates organization and direction of the fiber to the equipment of the bay(s). In addition, an important object of the present invention is to provide a fiber management assembly that is space-saving and, most preferably, fits within the space defined between adjacent equipment bays. A further important object of the present invention is to provide a fiber management assembly that has a simple, inexpensive and durable construction.

In accordance with these and other objects evident from the following description of the preferred embodiment, the present invention concerns a fiber management assembly having a case configured for placement adjacent a bay of equipment. The case presents a fiber storage chamber, a fiber inlet opening configured to receive the fiber entering the storage chamber, and a fiber outlet opening configured to receive the fiber exiting the storage chamber. Within the fiber storage chamber is an adjustable slack take-up mechanism configured to support excess fiber in a looped arrangement. The assembly further includes a fiber router configured to support the fiber adjacent the outlet opening as the fiber exits the storage chamber and is directed to the bay of equipment.

Other aspects and advantages of the present invention will be apparent from the following detailed description of the preferred embodiments and the accompanying drawing figures.

BRIEF DESCRIPTION OF THE DRAWING FIGURES

A preferred embodiment of the invention is described in detail below with reference to the attached drawing figures, wherein:

FIG. 6 is a fragmentary, exploded perspective view of one of the spool assemblies and the upper ends of the X-shaped rails; and FIG. 7 is a horizontal cross-sectional view of the slack take-up mechanism taken along line 7—7 of FIG. 2a.

DETAILED DESCRIPTION OF THE PREFERRED EMBODIMENT

Figure 1:
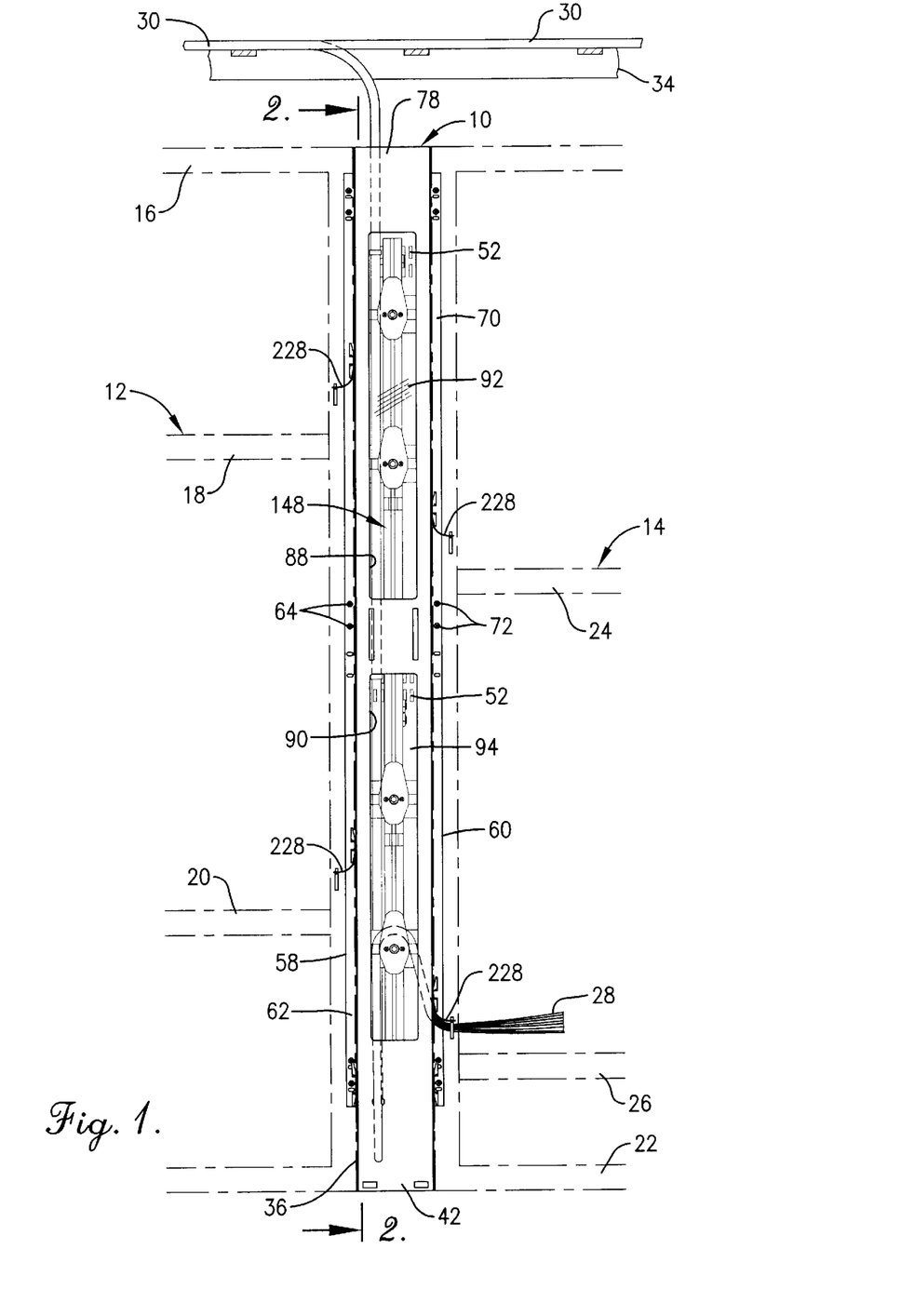
FIG. 1 is a front elevational view of a fiber management assembly constructed in accordance with the principles of the present invention, particularly illustrating the assembly being located between adjacent bays of equipment.

Turning initially to FIG. 1, the fiber management assembly 10 selected for illustration is configured for placement between a pair of upright equipment bays 12 and 14. The illustrated assembly 10 may consequently be referred to as an upright, inter-bay unit. However, the principles of the present invention are equally applicable to a fiber management assembly configured for placement adjacent horizontally extending equipment bays (not shown), wherein the management assembly would be above or below the horizontal bays. Of course, the illustrated assembly 10 may be used with only one equipment bay. It is also possible to utilize the inventive fiber management assembly with virtually any type of structure or system having equipment connected to a large number of fibers.

With the foregoing caveat in mind, it is initially noted that the illustrated equipment bays 12 and 14 are of standard construction. It shall therefore be sufficient to explain that the left bay 12 comprises a rectangular, generally boxlike rack 16 having a pair of adjustable equipment support shelves 18 and 20. Although not illustrated, various equipment with fiber connections may be supported on the rack 16. For example, when the management assembly 10 is used in an optical fiber application, high density optical transport equipment is supported on the rack 16. The right equipment bay 14 similarly includes a rack 22 having a pair of adjustable shelves 24 and 26.

Figure 2A:
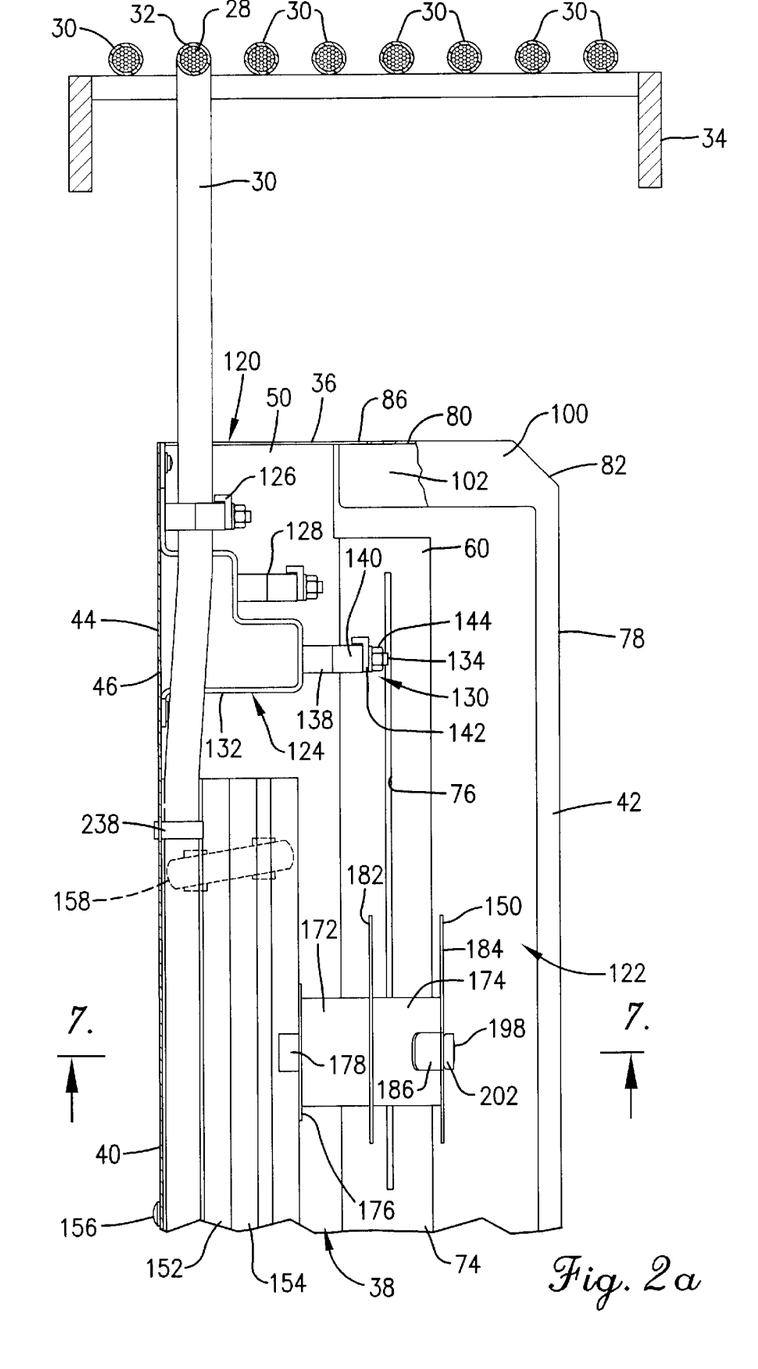
FIG. 2a is a fragmentary, vertical cross-sectional view of the upper end of the assembly taken along line 2—2 of FIG. 1, particularly illustrating one of the fanout cables extending downwardly from the overhead support rack, through the top of the case and into the storage chamber.

The assembly 10 is shown in the drawing figures as managing optical fibers 28 connected to the right equipment bay 14. In the usual manner, a plurality of the fibers 28 are bundled together as part of a single cable 30, and the cable 30 includes a sheath 32 to encase the bundle of fibers 28. This arrangement is typically referred to as a fanout cable. As shown in FIGS. 1 and 2a, a plurality of the fanout cables 30 are supported on an overhead rack 34 that extends above and along the bank of equipment bays. Generally speaking, the cable 30 is directed downwardly from the rack 34, into the management assembly 10, and to the equipment bay 14 to which the fibers 28 are connected. It will be appreciated, however, that the principles of the present invention are equally applicable to arrangements where the cable 30 enters the management assembly 10 from below or at some point between the top and bottom ends of the assembly 10. It is also entirely within the ambit of the present invention to use the assembly 10 in various other fiber applications where there are numerous fibers being directed to a single piece of equipment or a series of closely situated equipment. For example, the assembly 10 may be useful in computer networking stations where a large number of fibers or coaxial cables are being directed to one or more servers.

Figure 2B:
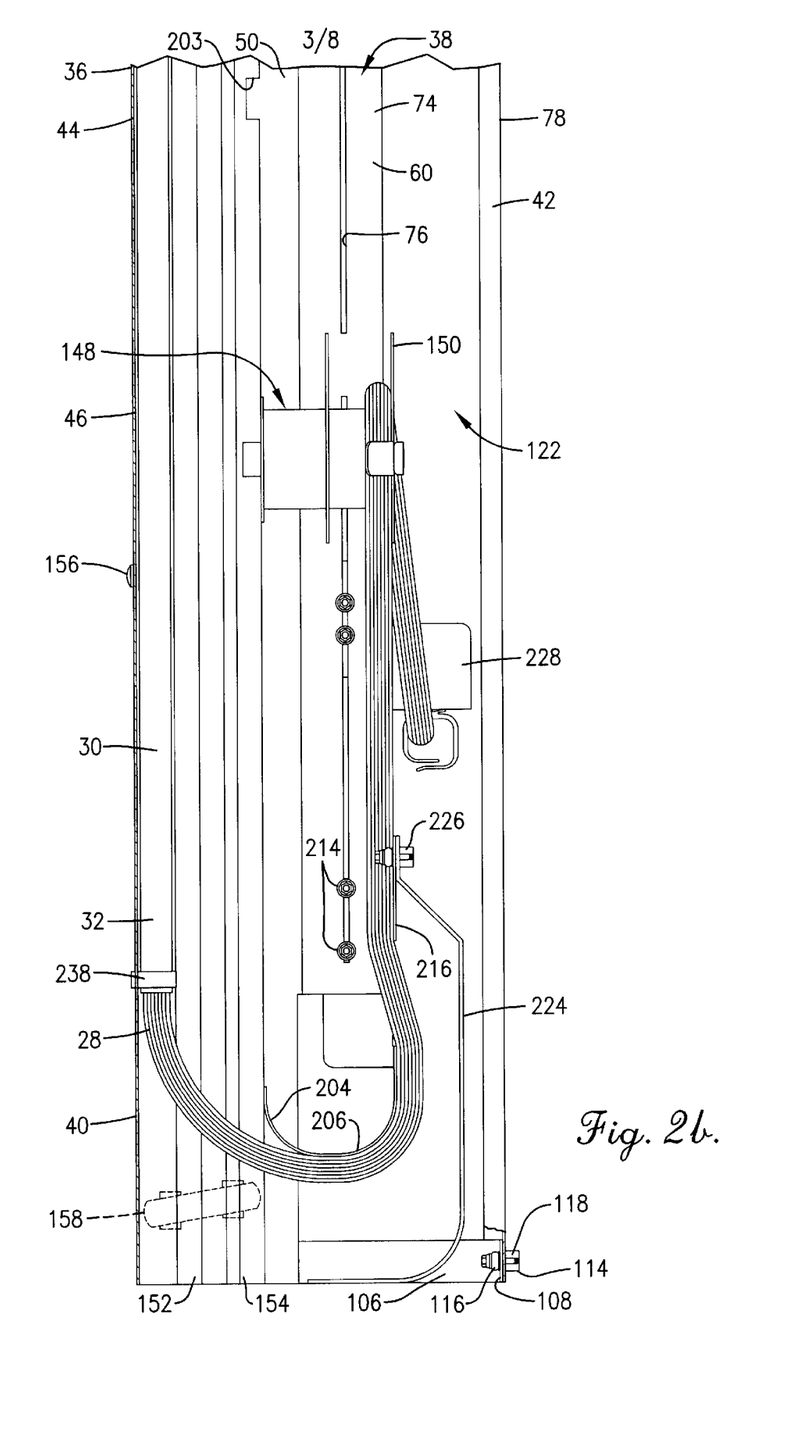
FIG. 2b is a fragmentary, vertical cross-sectional view of the lower end of the assembly taken along line 2—2 of FIG. 1, particularly illustrating the fanout cable looped around the lower bail assembly to extend upwardly to loop around the lowermost spool assembly and then directed downwardly to loop around the fiber router.

The illustrated fiber management assembly 10 includes a generally rectangular case 36 dimensioned to fit snugly between the equipment bays 12 and 14, although it is within the ambit of the present invention to utilize other variously dimensioned and shaped cases. The case 36 defines an internal storage chamber 38 (see FIGS. 2a and 2b) in which excess fiber is neatly organized. Particularly, the case 36 comprises a hollow, boxlike rear section 40 presenting an open front which is selectively covered by a removable front cover 42.

Figure 4A:
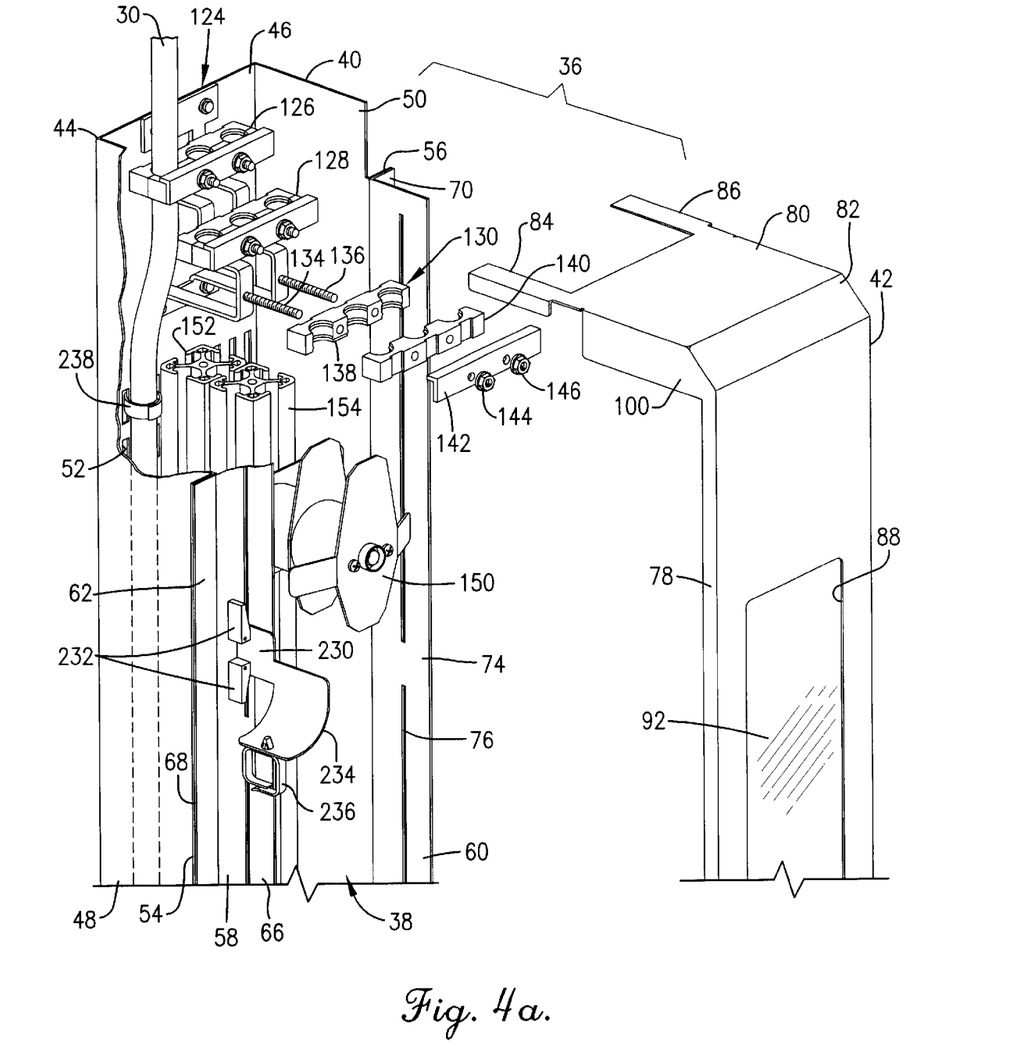
FIG. 4a is a fragmentary, partly exploded, perspective view of the upper end of the assembly, particularly illustrating the cover being removed and the lower clamp in an exploded condition.
Figure 4B:
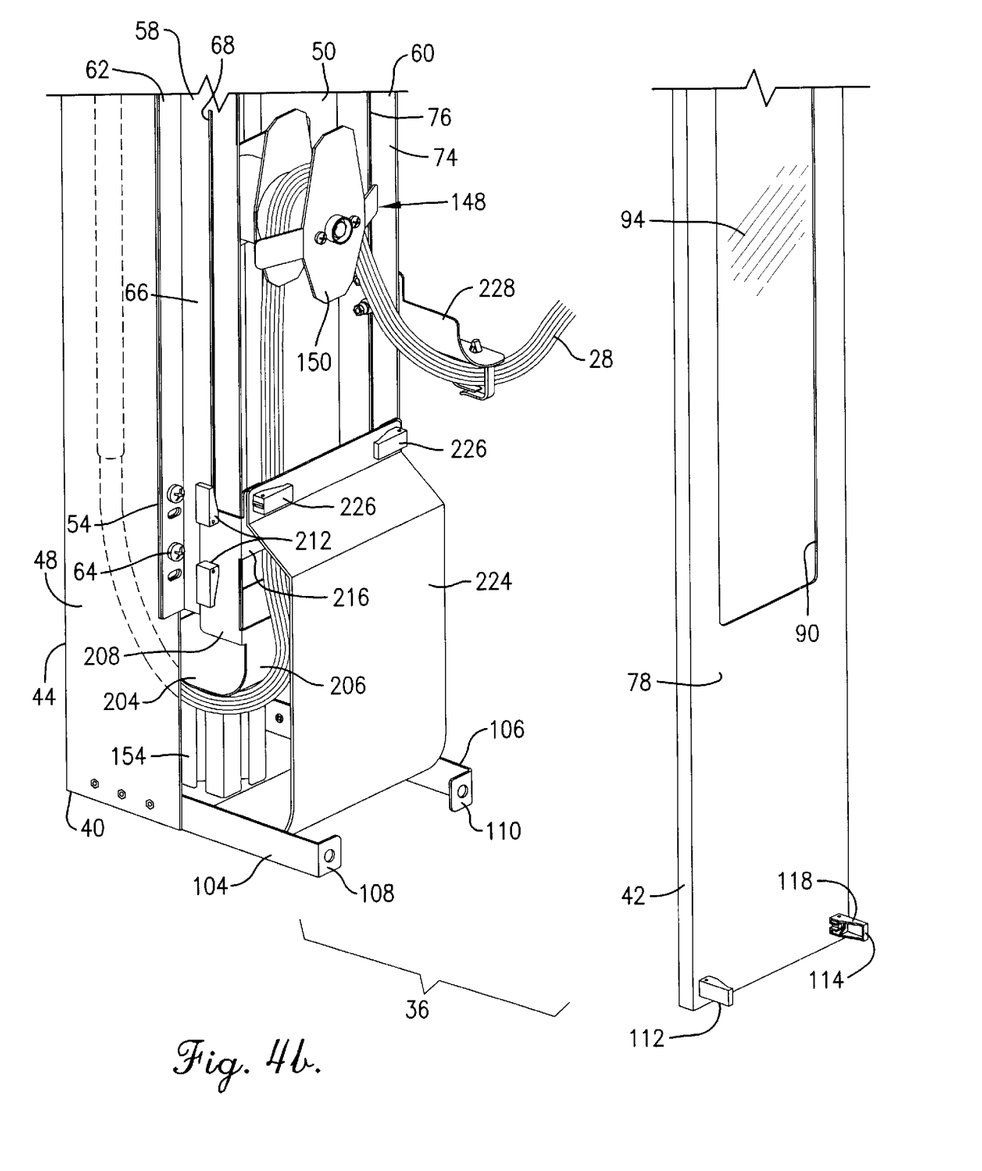
FIG. 4b is fragmentary, partly exploded, perspective view of the lower end of the assembly, particularly illustrating the cover being removed.

The rear section 40 of the case 36 includes a generally U-shaped channel member having a rear wall 46 and a pair of sidewalls 48 and 50 projecting forwardly from the rear wall 46 (see FIG. 4a). The rear wall 46 is provided with a plurality of vent holes 52 arranged in spaced apart pairs of horizontal rows (see FIGS. 1 and 4a). Projecting outwardly from each of the sidewalls 48 or 50 is an attachment flange 54 or 56. The rear section 40 further includes a pair of L-shaped extension members 58 and 60 attached to the channel member 44. It is particularly noted that the left extension member 58 includes a flange 62 secured to the left flange 54 of the channel member 44 by fasteners 64 (see FIG. 4b). The left extension member 58 also includes a plate 66 that is coplanar with the left sidewall 48 of the channel member 44 and is provided with spaced apart, vertically extending slots 68. The right extension member 60 similarly includes an attachment flange 70 fastened to the flange 56 of the channel member 44 by fasteners 72 (see FIGS. 1 and 4a), and further similarly includes a plate 74 having spaced apart slots 76. Although not illustrated in detail, it will be appreciated that the fasteners 64 and 72 may also be used to secure the rear section 40 of the case 36 to the equipment bays 12 and 14. In such an arrangement, the flanges 54 and 56 are preferably placed against the front of the racks 16 and 22 as shown in FIG. 1.

The rear section 40 of the case 36 consequently presents open top and bottom ends defined cooperatively by the channel member 44 and extension members 58 and 60. Furthermore, the rear section 40 is open along the front thereof.

Figure 3:
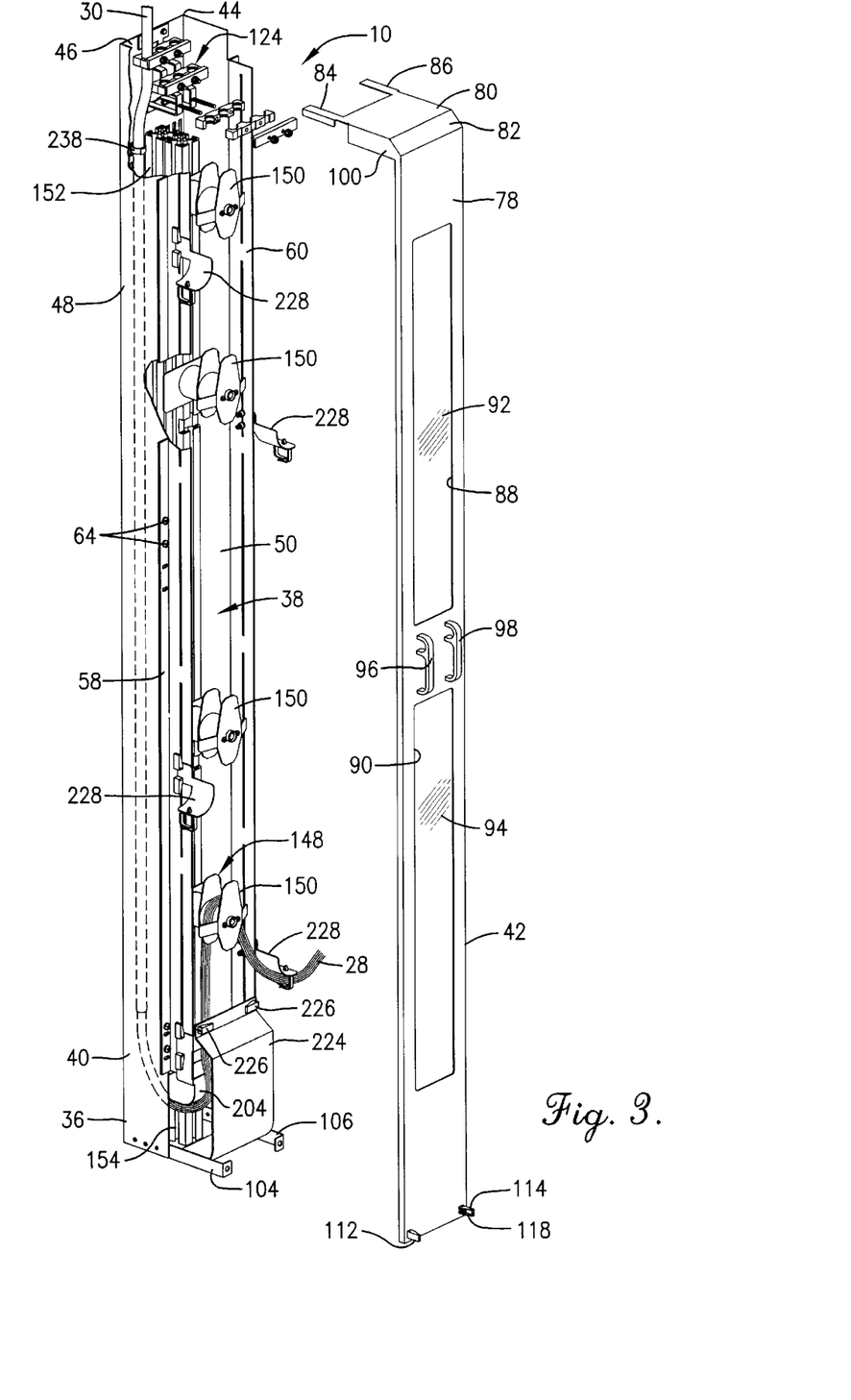
FIG. 3 is a partly exploded, perspective view of the fiber management assembly.

The cover 42 cooperates with the rear section 40 to substantially enclose the storage chamber 38. The cover 42 generally includes a vertical plate 78, a top horizontal plate 80, a corner transition plate 82 extending between the plates 78 and 80, and a pair of spaced apart ears 84 and 86 projecting rearwardly from the top plate 80. The vertical plate 78 is lipped along its sides and includes two rectangular openings 88 and 90 each preferably being covered by a translucent sheet 92 and 94 (e.g., tinted plexiglass). A pair of handles 96 and 98 are attached to the vertical plate 78 between the openings 88 and 90. It is also noted that gussets 100 and 102 extend between the sides of the plates 78,80,82 (see FIGS. 2a and 3).

Each of the ears 84 and 86 is generally L-shaped and dimensioned to rest against the top and outer face of the respective one of the sidewalls 48 and 50, when the cover 42 is placed in a covering relationship with the open front of the rear section 40. The ears 84 and 86 consequently serve as guides as the cover 42 is attached to the rear section 40 and further cause the cover 42 to be supported on the rear section 40. It is again noted that an open space is defined between the ears 84 and 86.

The lower end if the cover 42 is releasably secured to the rear section 40 as will now be described. A pair of L-shaped mounting arms 104 and 106 fastened to the channel member sidewalls 48 and 50, respectively, are dimensioned to engage the vertical plate 78 when the ears 84 and 86 have been properly oriented on the channel member 44. The arms 104 and 106 cooperatively present inwardly projecting, apertured flanges 108 and 110 to which the vertical plate 78 is releasably latched by latch mechanisms 112 and 114. It is noted that the latch mechanisms 112 and 114 are conventional in construction and may be obtained from Southco, Inc. of Concordville, Pa. under the designation "Swell Latch". Thus, only the right latch mechanism 114 will be briefly described, with the understanding that the left latch mechanism 112 is similarly constructed. As perhaps best shown in FIG. 2b, the latch mechanism 114 includes a compressible, elastomeric bushing 116 that may be inserted through the apertured flange 110 when the bushing has not been compressed. A swingable handle 118 is coupled to the bushing 116 to permit manual control of compression and decompression of the latter. Particularly, when the handle 118 is in the orientation shown in FIG. 4b, the bushing 116 is not compressed and may be inserted through the flange 110. Upon swinging the handle 118 90° to the position shown in FIG. 2b, the bushing 116 is compressed and consequently presents a diameter that is greater than the diameter of the aperture in the flange 110. The cover 42 is consequently prevented from disengaging the rear section 40. Furthermore, because of the elastic tendency of the bushing 116 to expand to its original decompressed condition, the bushing 116 provides a residual force that restricts vertical and side-to-side movement of the plate 78 relative to the arm 106.

When the cover 42 is attached to the rear section 40, a fiber inlet opening 120 is presented at the top of the case 36 (see FIG. 2a). The inlet opening 120 is configured to receive the fibers 28 as they are directed downwardly from the overhead rack 34 and into the storage chamber 38. It is particularly noted that the rear wall 46 of the rear section 40 and the ears 84,86 and horizontal plate 80 of the cover 42 cooperative define the inlet opening 120. The case 36 preferably presents the fiber inlet opening proximal to the fiber cable support outside the assembly 10.

For example, if the management assembly is used with a subfloor cable rack (not shown), the inlet opening would preferably be defined in the bottom of the case 36. As perhaps best shown in FIGS. 2a and 2b, the rear case section 40 and cover 42 also cooperate to define a pair of fiber outlet openings 122 (only the right side opening being shown in the drawing figures). The outlet openings 122 extend along the opposite sides of the case 36 and almost completely from the bottom to the top of the case. The left and right outlet openings 122 are configured to receive the fibers 28 as they exit the storage chamber 38 and are directed to the respective one of the equipment bays 12 and 14. Particularly, the illustrated outlet openings 122 are each defined between the, front cover 42, the respective left or right extension member 58 or 60, and the extreme upper and lower portions of the respective left or right sidewall 48 or 50.

A fiber strain relief assembly 124 provided adjacent the inlet opening 120 serves to relieve axial loading on the fibers 28. The illustrated strain relief assembly 124 comprises three cable clamps 126,128,130 supported on the rearwall 46 of the rear case section 40 by a stepped bracket 132 (perhaps best shown in FIGS. 2a and 4a). The consequential stepped arrangement of the clamps 126,128,130 permits the clamps to simultaneously grip fiber cables without causing cable interference. Turning first to the lower clamp 130, a pair of elongated threaded fasteners 134 and 136 (e.g., bolts) project from the bracket 132 and through a pair of clamping jaws 138 and 140 (see FIG. 4a). Each of the jaws 138 and 140 includes three semicircular openings that cooperate with the openings of the other jaw to define three cable-receiving openings that are slightly undersized relative to the diameter of the cable 30. Accordingly, when the jaws 138 and 140 are squeezed together, the cable is snugly gripped by the jaws 138 and 140 and longitudinal loading of the cable is consequently relieved at the clamp 130. An L-shaped distribution plate 142 fits matingly over the outer jaw 140 and cooperates with the bracket 132 to squeeze the jaws 138 and 140 toward one another when the nuts 144 and 146 are tightened on the respective fasteners 134 and 136. The jaws 138 and 140 are formed of any suitable material (e.g., ultra-high molecular weight polyethylene), while the bracket 132, plate 142 and threaded components 134,136,144,146 are formed of metal (e.g., stainless steel). The top and intermediate clamps 126 and 128 are similarly constructed and therefore will not be described in detail herein. It is noted that the clamps may alternatively be arranged to grip different sized cable, if desired.

A slack takeup mechanism 148 is provided within storage chamber 38 to neatly arrange excess fiber into a looped arrangement. The mechanism 148 preferably includes a plurality of spool assemblies 150 which are vertically adjustable within the storage chamber 38. A pair of X-shaped rails 152 and 154 serve to support the spool assemblies 150 within the storage chamber 38 for sliding movement along a common, vertical path. The rails 152 and 154 are similar in construction, with each rail having an equal-sided cross-sectional shape and a longitudinal track defined in each of the four sides. The rail 152 is fastened to the rear wall 46 of the rear case section 40 by vertically spaced screws 156 (see FIGS. 2a and 2b), while the front rail 154 is in turn fixed to the rear rail 152 by a plurality of connectors 158. As perhaps best shown in FIG. 7, each of the connectors 158 includes a pair of screws 160 and 162 projecting through a cotton bar 164 and being in general alignment with the tracks defined along the left or right side of the rails 152, 54. A retaining nut 166 and 168 slidably captured in the track of each of the rails 152 and 154 threadably interengages the respective screw 160 and 162, The nuts 166 and 168 are dimensioned to prevent their rotation within the tracks so that tightening rotation of the screws 160 and 162 causes the rails 152 and 154 to be fixedly interconneted.

Figures 6, 7:
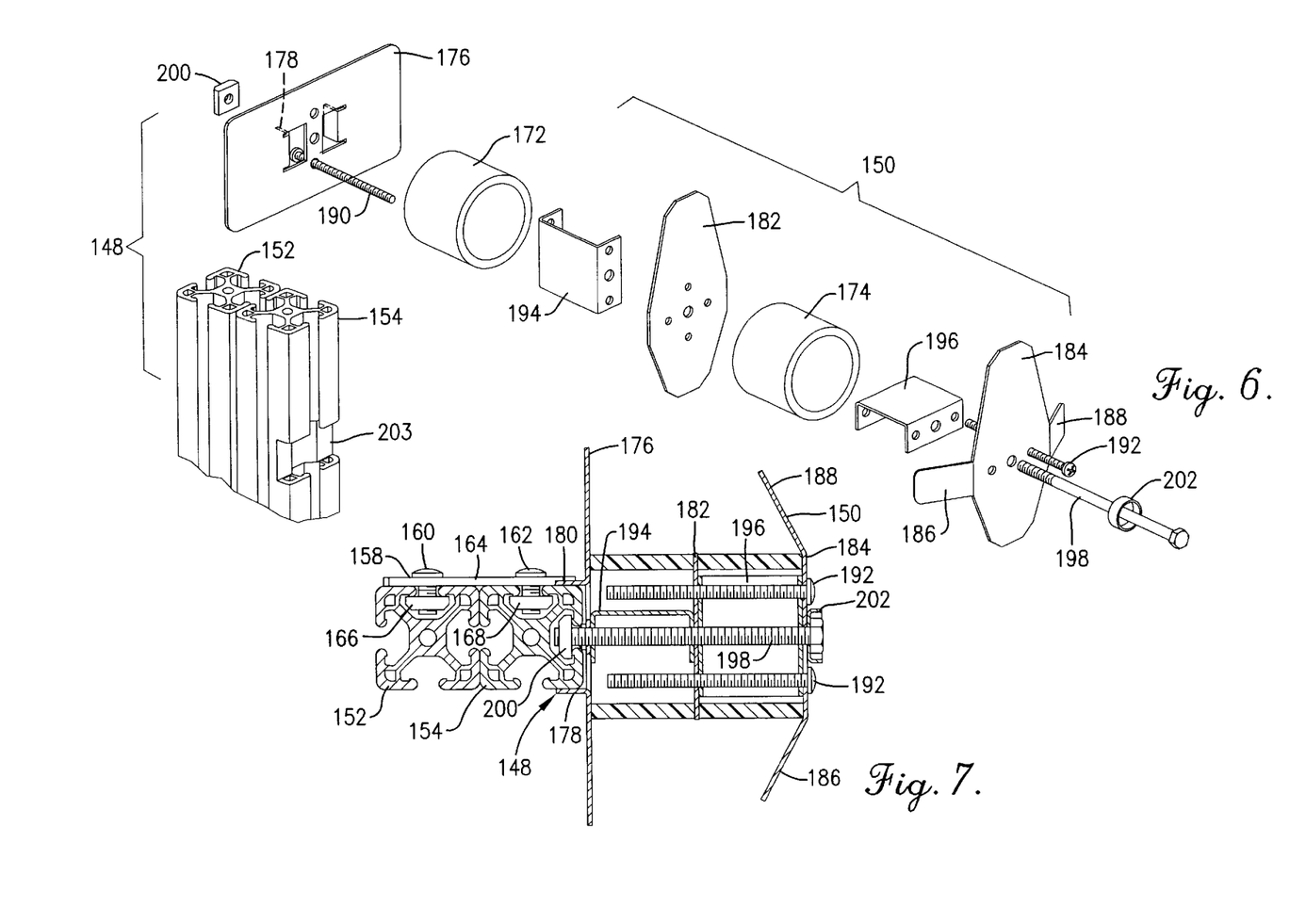

The spool assemblies 150 are identical in construction, and it shall therefore be sufficient to explain only one of the spool assemblies with the understanding that the remaining assemblies are similarly constructed. Turning particularly to FIGS. 6 and 7, the illustrated spool assembly 150 includes two spools 172,174 each having circular cross-sectional shape so that the spools cooperatively present an outer, cylindrical surface about which the fiber 28 may be wrapped. The spools 172,174 are preferably formed of a tubular material e.g., PVC tubing). It is particularly noted that the outer fiber wrap surface presents a radius of curvature that prevents bending of the fiber 28 beyond the minimum bend angle when the fiber 28 is wrapped around the spools 172,174. For example, when the management assembly 10 is used with three millimeter fiber, the spools 172 and 174 have a diameter of at least two inches.

A fiber retaining plate 176 is provided just behind the rear spool 172 to prevent wrapped fiber from slipping off the rear end of the spool 172. The illustrated retaining plate 176 is rectangular in shape and includes a pair of rearwardly projecting guide tabs 178,180 that are configured to slidably engage opposite sides of the front rail 154. A somewhat tear-drop shape dividing plate 182 is located between the spools 172,174 and consequently divides the fiber wrap surface in half. A forwardmost fiber retaining plate 184 serves to prevent wrapped fiber from slipping off the front end of the spool 174. The forwardmost plate 184 is similar in shape to the dividing plate 182, except for a pair of horizontally projecting wings 186,188 which increase the retaining capacity of the plate 184. The rear retaining plate 176 is fixed to the center dividing plate 182 by a pair of bolts 190 (only one being shown in FIG. 6) which pass through the rear plate 176 and threadably interengage with the dividing plate 182. The front retaining plate 184 is similarly fastened to the dividing plate 182 by a pair of bolts 192 (see also FIG. 7). It is noted that the bolts 190 are disposed along a vertical line, while the bolts 192 are horizontally oriented.

Each of the spools 172 and 174 is associated with an internal U-shaped spacer 194 and 196. The spacers 194 and 196 are dimensioned to engage the respective plates 176,182 and 182,184 and are provided with openings to receive the corresponding bolts 190 and 192. The spacers 194 and 196 maintain the general axial alignment of the spools 172 and 174, as well as maintain proper spacing of the plates 176,182,184 when the assembly 150 is assembled.

A central bolt 198 passes through the spools 172,174, plates 176,182,184 and spacers 194,196 to threadably engage a retaining nut 200 slidably captured within the frontmost track of the rail 154. The nut 200 is dimensioned so as to prevent its rotation within the track. A cup-shaped washer 202 is preferably provided between the bolt head and the front fiber retaining plate 184 Moreover, the spool assembly 150 is locked in place relative to the rail 154 when the bolt 198 is sufficiently rotated in a tightening direction. Adjustment of the position of the spool assembly 150 requires only "loosening" of the bolt 198 and nut 200, repositioning of the assembly 150, and "tightening" of the bolt 198 and nut 200. A plurality of spaced apart notches 203 are defined in the front side of the rail 154 to facilitate the addition and/or the removal of spool assemblies 150.

The slack takeup mechanism 148 further includes an adjustable lower bail assembly 204 (see FIGS. 2b and 5) about which the fiber 28 may be looped and redirected upwardly within the storage chamber 38. The bail assembly 204 includes a bail 206 that presents a convex outer surface about which the fiber 28 is wrapped. In the preferred embodiment, the bail 206 is formed by a plate that presents a somewhat U-shaped transverse configuration (see particularly FIG. 2b). A pair of side flanges 208 and 210 connected to the bail 206 are configured for placement just outboard of the extension members 58 and 60 of the rear case section 40. The side flanges 208 and 210 are each provided with a pair of latch mechanisms 212 and 214 (similar to those described above) received within the lower slots of the extension members 58 and 60. The latch mechanisms 212 and 214 slidably mount the bail assembly 204 on the rear case section 40 for adjustable vertical positioning. Spaced above the bail 206 and extending between the side flanges 208 and 210 is a face plate 216. The plate 216 is provided with a series of vertically extending slots 218 and has a pair of apertured, upwardly extending ears 220 and 222 adjacent the respective side flanges 208 and 210. A kick-plate 224 is mounted to the bail assembly 204 by latch mechanisms 226 which project through the apertured ears 220,222 of the face plate 216.

The fiber management assembly 10 includes a plurality of fiber routers 228, each of which is adjustably positioned along the length of one of the fiber outlet openings 122 and configured to support the fiber as it exits the storage chamber 38 and is directed to the adjacent one of the equipment bays 12 and 14. In the illustrated embodiment, there are two fiber routers on each side of the case 36 (see FIG. 1), although it is entirely within the ambit of the present invention to provide a greater or lesser number of routers if desired. The fiber routers 228 are similarly constructed, and only one of the routers will be detailedly described herein.

Turning to FIG. 4a, the preferred fiber router 228 includes a base 230 that is slidably supported for adjustable positioning along the left extension member 58 by a pair of latch mechanisms 232 (similar to those described hereinabove). It is noted that the router 228 illustrated in FIG. 4a is associated with the upper slot of the extension member 58 and is thereby afforded only limited vertical adjustment (i.e., the ends of the slot define the limitations of adjustability for the router). If desired, the extension member 58 may be provided with a continuous slot so that the router 228 is adjustable essentially along the full length of the former. The base 230 includes a fin section 234 that presents a convex, lower, fiber engagement surface about which the fiber 28 may be wrapped. It may be said that the fin section 234 is located within or, at the very least, in fore-and-aft alignment with the fiber outlet opening (see also FIG. 2b). Furthermore, the illustrated fin section 234 comprises an arcuately-shaped wall that curves downwardly and leftwardly so that the fiber 28 loops under the fin section 234, although it is entirely within the ambit of the present invention to arrange the fin section so that the fiber 28 may be looped over the fin section 234. The fiber engagement surface defined by the fin section 234 has a radius of curvature that prevents excessive bending of the fiber 28 as it exits the storage chamber 38 and is directed to the equipment bay 12. A fiber retaining clip 236 is attached to the base 230 adjacent the distal end of the fin section 234. The illustrated clip 236 can swivel relative to the base and presents a ring which may be elastically pried open to insert the fiber therein. The clip 236 retains the fiber against the fin section 234.

The use of the fiber management assembly 10 should be apparent from the foregoing description. It shall therefore be sufficient to explain that the cable 30 is directed downwardly from the overhead rack 34, through the inlet opening 120 of the case 38, and into the storage chamber 38. The cable 30 is preferably gripped by one of the clamps 126,128,130 (see FIG. 4a) to relieve any axial loading in either direction relative to the clamp. A plurality of attachment straps 238 are provided to secure the cable 30 against the rear wall 46 of the rear case section 40 (see FIGS. 2a, 2b and 4a). Each of the attachment straps 238 preferably comprises a fabric strip having hook and loop fastening material on opposite sides thereof, although other suitable attachment devices (e.g., so-called "twist-ties") may be used. The attachment strap 238 passes through one or more of the vent holes 52 defined in the rear wall 46 and is secured about the cable 30. The cable 30 preferably extends down to the bottom of the case 36 and loops around the bale assembly 204 to be redirected upwardly. In the illustrated embodiment, the distal portion of the sheath 32 has been removed from the fibers 28 so that the section of cable 30 in the lower part of the storage chamber 38 comprises only the loose set of fibers 28. However, removal of such a substantial portion of the sheath 32 is not required, as it may only be necessary to remove a small portion of the sheath 32 at the equipment bay 14.

Figure 5:
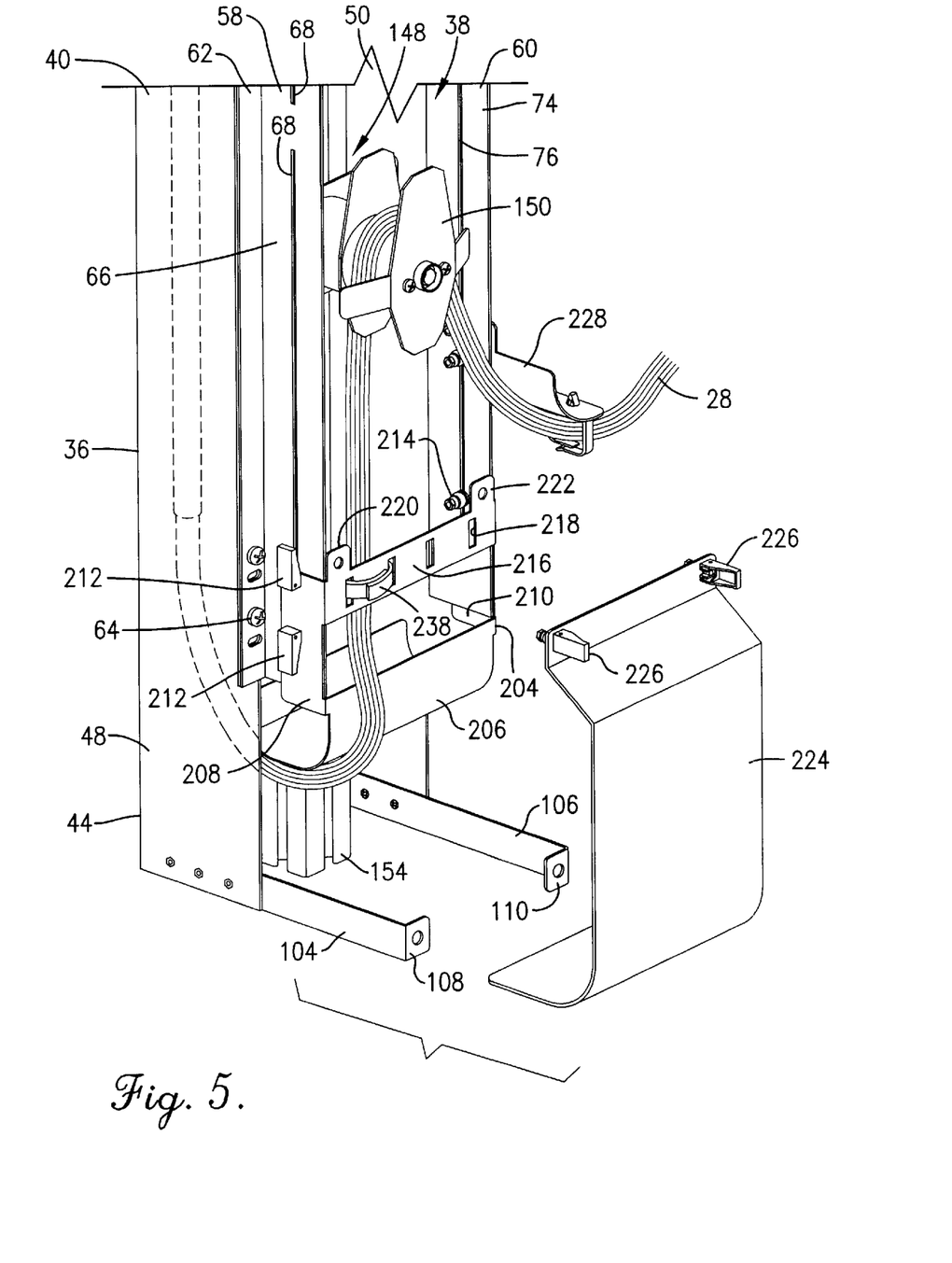
FIG. 5 is a fragmentary, partly exploded, perspective view of the lower end of the assembly similar to FIG. 4b, but with the cover not being shown and the kick-plate being removed.

One of the attachment straps 238 is preferably used to secure the fiber 28 to the bail assembly 204, as shown in FIG. 5. The fiber 28 is then wrapped around one or more of the spool assemblies 150 and finally directed outwardly through the outlet opening 122. The fiber 28 is wrapped around and supported by the fiber router 228 as it exits the storage chamber 38 and is directed to the equipment bay 14.

It is again noted that the spool assemblies 150 and bail assembly 204 cooperatively support excess fiber in a looped arrangement within the storage chamber 38, while preventing bending of the fiber beyond the minimum bend angle. The assemblies 150 and 204 are adjustable as is necessary, and there is no requirement that the fiber 28 be arranged in the manner shown in the drawing figures. For example, there may only be enough fiber to wrap around just one of the spool assemblies 150 without looping under the bail assembly 204. Furthermore, the fiber routers 228 are positioned at generally the same height as the equipment (not shown) to which the fiber 28 is connected.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A fiber management assembly for managing fiber connected to a bay of equipment, said fiber management assembly comprising:

a case configured for placement adjacent the bay of equipment, said case Presenting a fiber storage chamber, a fiber inlet opening configured to receive the fiber entering the storage chamber, and a fiber outlet opening configured to receive the fiber exiting the storage chamber;

an adjustable slack take-up mechanism slidably coupled to the case and configured to support excess fiber in a looped arrangement within the storage chamber; and a fiber router configured to support the fiber adjacent the outlet opening as the fiber exits the storage chamber and is directed to the bay of equipment.

2. A fiber management assembly as claimed in claim 1, said outlet opening being elongated to extend along the bay of equipment, said fiber router being mounted on the case for adjustable positioning along the length of the outlet opening.

3. A fiber management assembly as claimed in claim 1, said slack take-up mechanism including a plurality of spools assemblies, with each of the spool assemblies being adjustably positioned within the storage chamber and presenting a fiber wrap surface adapted to engage the fiber when the fiber is wrapped therearound.

4. A fiber management assembly for managing fiber connected to a bay of equipment, said fiber management assembly comprising:

a case configured for placement adjacent the bay of equipment, said case presenting a fiber storage chamber, a fiber inlet opening configured to receive the fiber entering the storage chamber, and a fiber outlet opening configured to receive the fiber exiting the storage chamber;

an adjustable slack take-up mechanism to support excess fiber in a looped arrangement within the storage chamber; and a fiber router configured to support the fiber adjacent the outlet opening as the fiber exits the storage chamber and is directed to the bay of equipment, said outlet opening being elongated to extend along the bay of equipment, said fiber router being mounted on the case for adjustable positioning along the length of the outlet opening, said fiber router including a base that is slidably supported on the case and that presents a fiber engagement surface adapted to engage the fiber when the fiber is wrapped therearound, said fiber router further including a fiber retaining clip attached to the base and configured to retain the fiber against the engagement surface.

5. A fiber management assembly as claimed in claim 4, said case presenting a generally rectangular configuration and including an open front, boxlike rear section and a front cover that is removably attached to the rear section to at least generally cover the front of the rear section.

6. A fiber management assembly as claimed in claim 5, said case being open at the top to define the inlet opening, said rear section and front cover being spaced apart along a side of the case to cooperatively define the outlet opening therebetween.

7. A fiber management assembly as claimed in claim 4, said engagement surface of the base being arcuate and having a radius of curvature that prevents excessive bending of the fiber.

8. A fiber management assembly for managing fiber connected to a bay of equipment, said fiber management assembly comprising:

a case configured for placement adjacent the bay of equipment, said case presenting a fiber storage chamber, a fiber inlet opening configured to receive the fiber entering the storage chamber, and a fiber outlet opening configured to receive the fiber exiting the storage chamber;

an adjustable slack take-up mechanism configured to support excess fiber in a looped arrangement within the storage chamber; and a fiber router configured to support the fiber adjacent the outlet opening as the fiber exits the storage chamber and is directed to the bay of equipment, said slack take-up mechanism including a plurality of spools assemblies, with each of the spool assemblies being adjustably positioned within the storage chamber and presenting a fiber wrap surface adapted to engage the fiber when the fiber is wrapped therearound, said spool assemblies each comprising a plurality of spaced apart plates and a plurality of generally axially aligned cylindrical bodies each extending between a corresponding pair of the plates, said bodies cooperatively defining the fiber wrap surface.

9. A fiber management assembly as claimed in claim 8, said case presenting a generally rectangular configuration and being open at one end to define the inlet opening, said spool assemblies being adjustable along the length of the storage chamber, said slack take-up mechanism including a bail assembly adjacent the end of the case opposite from the inlet opening, said bail assembly including a fiber wrap face adapted to engage the fiber when the fiber is wrapped therearound.

10. A fiber management assembly as claimed in claim 9, said bail assembly being adjustably positioned along the length of the storage chamber.

11. A fiber management assembly for managing fiber connected to a bay of equipment, said fiber management assembly comprising:

a case configured for placement adjacent the bay of equipment, said case presenting a fiber storage chamber, a fiber inlet opening configured to receive the fiber entering the storage chamber, and a fiber outlet opening configured to receive the fiber exiting the storage chamber;

an adjustable slack take-up mechanism configured to support excess fiber in a looped arrangement within the storage chamber;

a fiber router configured to support the fiber adjacent the outlet opening as the fiber exits the storage chamber and is directed to the bay of equipment; and a clamp including a pair of relatively shiftable clamping jaws that are configured to be compressed about the fiber for relieving axial loading on the fiber.

12. A fiber management assembly as claimed in claim 11, said clamp being located adjacent the inlet opening.

13. A fiber management assembly for managing fiber connected to an upright bay of equipment, said fiber management assembly comprising:

a generally rectangular case configured for placement alongside the bay of equipment, said case presenting a fiber storage chamber extending along the length of the case, a fiber inlet opening that is adjacent one end of the case and is configured to receive the fiber entering the storage chamber, and an elongated fiber outlet opening extending along the side of the case adjacent the bay of equipment and being configured to receive fiber exiting the storage chamber;

a clamp adjacent the inlet opening and including a pair of relatively shiftable clamping jaws configured to be compressed about the fiber for relieving axial loading on the fiber;

a slack take-up mechanism including a plurality of spool assemblies adjustably positioned along the length of the storage chamber and configured to support excess fiber in a looped arrangement; and at least one fiber router mounted on the case for adjustable positioning along the length of the outlet opening, said at least one fiber router being configured to support the fiber adjacent the outlet opening as the fiber exits the storage chamber and is directed to the bay of equipment.

14. A fiber management assembly as claimed in claim 13, said case including an open front, boxlike rear section and a front cover that is removably attached to the rear section to at least generally cover the front of the rear section.

15. A fiber management assembly as claimed in claim 13, said at least one fiber router including a base that is slidably supported on the case and that presents a fiber engagement surface adapted to engage the fiber when the fiber is wrapped therearound, said at least one fiber router further including a fiber retaining clip attached to the base and configured to retain the fiber against the engagement surface.

16. A fiber management assembly as claimed in claim 15, said engagement surface of the base being arcuate and having a radius of curvature that prevents excessive bending of the fiber.

17. A fiber management assembly as claimed in claim 13, each of said spool assemblies comprising a plurality of spaced apart plates and a plurality of generally axially aligned cylindrical bodies each extending between a corresponding pair of the plates, said bodies cooperatively defining a fiber wrap surface adapted to engage the fiber when the fiber is wrapped therearound.

18. A fiber management assembly as claimed in claim 17, said slack take-up mechanism including a bail assembly adjacent the end of the case opposite from the inlet opening, said bail assembly including a fiber wrap face adapted to engage the fiber when the fiber is wrapped therearound.

19. A fiber management assembly as claimed in claim 18, said bail assembly being adjustably positioned along the length of the storage chamber.

* * * * *